(12) United States Patent
Nakano et al.

(10) Patent No.: US 9,181,637 B2
(45) Date of Patent: Nov. 10, 2015

(54) METHOD FOR PRODUCING LONG FIBER NONWOVEN FABRIC

(75) Inventors: Yohei Nakano, Otsu (JP); Yoshikazu Yakake, Otsu (JP)

(73) Assignee: Toray Industries, Inc. (JP)

( * ) Notice: Subject to any disclaimer, the term of this patent is extended or adjusted under 35 U.S.C. 154(b) by 475 days.

(21) Appl. No.: 13/513,934

(22) PCT Filed: Dec. 6, 2010

(86) PCT No.: PCT/JP2010/071790
§ 371 (c)(1),
(2), (4) Date: Jun. 5, 2012

(87) PCT Pub. No.: WO2011/070999
PCT Pub. Date: Jun. 16, 2011

(65) Prior Publication Data
US 2012/0235316 A1 Sep. 20, 2012

(30) Foreign Application Priority Data
Dec. 9, 2009 (JP) ................. 2009-279359

(51) Int. Cl.
| B29C 47/88 | (2006.01) |
| D01F 6/76 | (2006.01) |
| D01D 5/098 | (2006.01) |
| D04H 3/00 | (2012.01) |

(52) U.S. Cl.
CPC .............. *D01F 6/765* (2013.01); *D01D 5/0985* (2013.01); *D04H 3/00* (2013.01)

(58) Field of Classification Search
USPC ............ 264/211.14, 172.11, 172.17, 172.19, 264/173.1, 175, 211.15, 441, 210.7, 210.8
See application file for complete search history.

(56) References Cited

U.S. PATENT DOCUMENTS

| 4,454,189 A * | 6/1984 | Fukata ........................ 428/339 |
| 6,471,910 B1 * | 10/2002 | Haggard et al. ............. 264/555 |
| 2002/0158362 A1* | 10/2002 | Kuroiwa et al. ............. 264/103 |

FOREIGN PATENT DOCUMENTS

| CN | 101532212 A | 9/2009 |
| JP | 1-018421 A | 1/1989 |
| JP | 2890470 B2 | 5/1999 |
| JP | 2005-154919 A | 6/2005 |
| JP | 2007-031876 A | 2/2007 |
| JP | 2008-223209 A | 9/2008 |
| WO | 2008/035775 A1 | 3/2008 |

* cited by examiner

*Primary Examiner* — Stella Yi
(74) *Attorney, Agent, or Firm* — DLA Piper LLP (US)

(57) ABSTRACT

A method for producing a long fiber nonwoven fabric includes (a) melting resin containing polyphenylene sulfide as main component, discharging it from a spinneret, solidifying resulting filaments by cooling and stretching the filaments by pulling them out of an ejector at a spinning speed of 3,000 m/min or more while heat-treating as the filaments travel to the ejector outlet to provide a long fiber; (b) collecting the long fiber on a moving net to form a nonwoven web; and (c) subjecting the nonwoven web to thermal bonding.

12 Claims, 1 Drawing Sheet

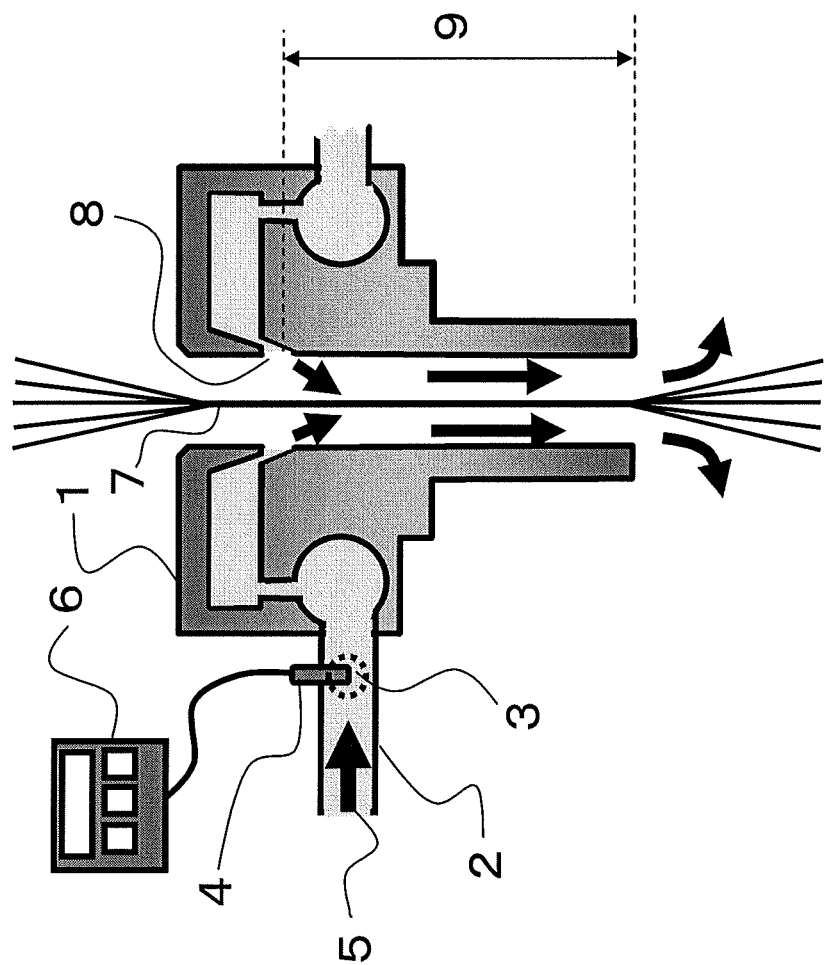

METHOD FOR PRODUCING LONG FIBER NONWOVEN FABRIC

RELATED APPLICATIONS

This is a §371 of International Application No. PCT/JP2010/071790, with an international filing date of Dec. 6, 2010 (WO 2011/070999 A1, published Jun. 16, 2011), which is based on Japanese Patent Application No. 2009-279359, filed Dec. 9, 2009, the subject matter of which is incorporated by reference.

TECHNICAL FIELD

This disclosure relates to a method for producing a long fiber nonwoven fabric made of resin containing polyphenylene sulfide (hereinafter, also abbreviated as "PPS") as main component. More specifically, the disclosure relates to a method for producing a long fiber nonwoven fabric made of resin that contains PPS as main component (hereinafter, also referred to as "PPS long-fiber nonwoven fabric") by simplified steps in a stable manner. This long fiber nonwoven fabric is free of shrinkage in width and wrinkles which may be caused by thermal shrinkage during thermal bonding of nonwoven webs.

BACKGROUND

PPS resin is excellent in properties including heat resistance, chemical resistance, flame resistance, and electrical resistance, and thus it is favorably used in engineer plastics, films, textiles, nonwoven fabrics, and so on. In particular, PPS long-fiber fabrics have been expected to be used in industrial applications such as heat-resistant filters, electrical insulation materials, and cell separators by fully utilizing these properties.

On the other hand, PPS long-fiber fabrics have disadvantages including poor dimensional stability against heat and extensive thermal shrinkage of fiber or nonwoven fabric. Until now, various proposals have been made to provide techniques for improving the dimensional stability of fiber or nonwoven fabric against heat.

For example, one of the proposed methods for obtaining a long fiber fabric comprises spinning PPS resin into a fiber by spin-bonding to make a fabric cloth; stretching it at a glass transition temperature or higher; and embossing the fabric preferably after biaxial stretching (see Japanese Unexamined Patent Application Publication (Kokai) No. 2005-154919). In addition, another proposed method for producing a long fiber fabric comprises spinning PPS resin by spin-bonding; subjecting the resulting fabric cloth to temporary bonding at a first crystallization temperature or less; and then subjecting the fabric to final bonding after heating at the first crystallization temperature or higher under strain (see Japanese Unexamined Patent Application Publication (Kokai) No. 2008-223209). However, as compared with a method for producing a spun-bonded nonwoven fabric from common resin such as polyester or polypropylene, the method for producing a nonwoven fabric from PPS resin by spin-bonding requires heat treatment equipment for thermal stretching or heat treatment of a nonwoven web or fabric cloth under strain. Thus, the method has a disadvantage in that the process is complicated and multi-staged, requiring large investment in equipment, while causing an increase in energy consumption.

Furthermore, there is another proposal for making the heat treatment equipment unnecessary by improving dimensional stability in the step of spinning PPS resin. For example, as a technique for improvement by resorting to raw materials, there is a proposed method for improving thermal dimensional stability by copolymerization of PPS resin with trichlorobenzene and then spinning and stretching the copolymerized product (see Japanese Patent No. 2890470). However, that proposal has a disadvantage in that the copolymerization with trichlorobenzene causes a decrease in spinnability and thread breakage frequently occurs at the time of spinning and stretching, thereby resulting in a lack of production stability.

As a technique for improvement in a spinning process, there is a proposed method for producing a heat-resistant nonwoven fabric with restrained thermal shrinkage by spinning PPS resin at a high spinning velocity of 7,000 to 11,000 m/min to improve the crystallinity of the fibers without stretching or heat treatment under strain (see WO 2008/035775). In that method, however, the high-speed spinning causes an increase in deformation of the fibers. Thus, the fibers tend to be broken frequently as the fibers are intolerable to deformation. In addition, an increase in energy consumption occurs because a large volume of compressed air is demanded. Furthermore, there is another proposed method for producing a PPS-spun-bonded nonwoven fabric by using air heated at a temperature of 80 to 100° C. to stretch PPS resin at a compressed air flow velocity of 300 to 3,000 m/min (see China Patent Application Publication No. 101532212). In that method, however, the spinning velocity is presumed to be less than 3000 m/min from the compressed air flow velocity. Thus, due to insufficient dimensional stability, there is the need of carrying out heat treatment under stain as a post-process in spite of excellent spinning stability.

Therefore, a method for producing a PPS long-fiber nonwoven fabric with excellent dimensional stability by simplified steps with stable spinnability has not been proposed.

It could therefore be helpful to provide a PPS long-fiber nonwoven fabric with excellent dimensional stability against heat by simplified steps with stable spinnability without subjecting a nonwoven fabric web to heat treatment in a post-process.

SUMMARY

We provide a method for producing a long fiber nonwoven fabric characterized by carrying out the following steps (a) to (c) in sequence:

(a) a step of melting resin containing polyphenylene sulfide as main component, discharging it from a spinneret, solidifying the resulting filaments by cooling, and stretching it by pulling it out of an ejector at a spinning speed of 3,000 m/min or more while heat-treating it as it travels to the ejector outlet to provide a long fiber;

(b) a step of collecting the long fiber on a moving net to form a nonwoven web; and (c) a step of subjecting the resulting nonwoven web to thermal bonding.

A PPS long-fiber nonwoven fabric with excellent dimensional stability against heat is obtained by simplified steps with stable spinnability without subjecting a nonwoven web to heat treatment in a post-process.

BRIEF DESCRIPTION OF THE DRAWING

FIG. 1 is an exemplary cross-sectional view of an ejector.

Explanation of Numerals

1: Ejector
2: Compressed Air Supplying Pipe
3: Temperature-Measuring Position
4: Temperature Sensor
5: Compressed Air
6: Thermometer
7: Filament
8: Air Gap
9: Length of Ejector

DETAILED DESCRIPTION

The method for producing a long fiber nonwoven fabric employs a spin-bonding method in which resin is melted, discharged from a spinneret, and solidified by cooling to produce a filament, which is pulled and stretched by an ejector, collected on a moving net to form a nonwoven web, and then subjected to thermal bonding. Of the operations of the above spin-bonding method, those up to the stretching are defined as step (a).

The resin contains PPS as a main component. The PPS is a polymer that contains a phenylene sulfide unit such as p-phenylene sulfide unit and m-phenylene sulfide unit as a repeating unit. Particularly, a substantially linear polymer containing 90 mol % or more of the p-phenylene sulfide unit is preferred in terms of heat resistance and spinnability.

In the PPS, it is preferred that trichlorobenzene is not substantially copolymerized. That is because the trichlorobenzene has three or more halogen substituents per benzene ring, and copolymerization thereof provides PPS with a branched structure, causing the spinnability of the PPS resin to become inferior and the fiber to be broken frequently at the time of spinning and stretching. The degree of which trichlorobenzene is not substantially copolymerized is preferably 0.05 mol % or less, more preferably 0.01 mol % or less.

The content of PPS in the resin is preferably 85 mass % or more, more preferably 90 mass % or more, further preferably 95 mass % or more in terms of heat resistance, chemical resistance, and the like. Hereafter, the resin containing PPS as main component is called "PPS resin."

In addition, the PPS resin may contain, as long as the effects are not impaired, a crystal-nucleating agent, a gloss reducing agent, a pigment, an antifungal agent, an antimicrobial agent, a flame retardant, a hydrophilizing agent, or the like.

Furthermore, the PPS resin preferably has a melt flow rate (hereinafter also abbreviated as MFR) of 100 to 300 g/10 min, measured according to ASTM D1238-70 (at a measuring temperature of 315.5° C. and a measuring load of 5 kg load). An MFR of 100 g/10 min or more, more preferably 140 g/10 min or more, allows the resin to have an appropriate flowability, prevents an increase in back pressure of the spinneret during melt spinning, and also prevents fiber breakage during pulling and stretching. On the other hand, by having an MFR of 300 g/10 minutes or less, more preferably 225 g/10 minutes or less, the melt can have an appropriately high polymerization degree or molecular weight to provide a strength or a heat resistance high enough for practical use.

The spinning temperature for melting and spinning the PPS resin is preferably 290 to 380° C., more preferably 300 to 360° C., further preferably 310 to 340° C. By maintaining the spinning temperature within the above range, the molten state can be stabilized to obtain an excellent spinning stability.

A cross-sectional shape of the fiber made of the PPS resin (also referred to as a "PPS fiber") may be, for example, any of circular, hollow circular, flat, polygonal, and multi-leaf (e.g., X- or Y-) shapes.

The methods that can be adopted for cooling filaments of PPS fibers discharged from a spinneret include, for example, the method of forcefully blowing cooling air onto a filament, the method of naturally cooling filaments at ambient temperature around the filament, the method of adjusting the distance between the spinneret and the ejector, or a combination thereof. Furthermore, the cooling conditions are suitably adjusted and applied in consideration of the amount of discharge per hole of a spinneret, a spinning temperature, an ambient temperature, and the like.

In the step (a), it is very important for the filament, which has been solidified by cooling, to be to pulled and stretched while being heat-treated as it travels to the ejector outlet. By doing so, the dimensional stability of the PPS fiber can be improved. Therefore, there is no need to subject nonwoven webs to heat treatment in a post-process which has been conventionally performed for dimensional stabilization. Thus, collected nonwoven webs can be directly subjected to thermal bonding. For nonwoven webs to have a high thermal dimensional stability so that they can be directly subjected to thermal bonding without heat treatment in a post-process, the long fiber has a boil-off shrinkage of preferably 20% or less, more preferably 15% or less, further preferably 10% or less. If the boil-off shrinkage of the long fiber exceeds 20%, shrinkage in width of the nonwoven web during thermal bonding becomes large, and the thermal bonding step tends to become difficult due to shrinkage/solidification and wrinkle formation.

It is not certain how the above measures lead to an increase in dimensional stability of a PPS fiber under heat. Heat treatment in the course from solidification by cooling to stretching, where the internal structure (e.g., crystalline/non-crystalline form and orientation) of the PPS fiber is dramatically changed, may effectively promote formation of a crystalline structure that contributes to an improvement in dimensional stability.

In this case, however, it is not only an increase in degree of crystallinity. Conventionally, as described in the aforementioned WO '775, it has been considered that the thermal dimensional stability of a PPS long-fiber nonwoven fabric requires a crystallinity of 25% or more. In contrast, the PPS fiber obtained by our production method has a good thermal dimensional stability even if the crystallinity is less than 25%. Conventionally, PPS fibers with a lower crystallinity has larger non-crystalline portions and are lower in thermal dimensional stability, while those with a higher crystallinity have smaller non-crystalline portions and are poorer in thermal bonding properties. In contrast, the PPS fiber obtained by our production method has the remarkable advantage of having both a high thermal dimensional stability and good thermal properties.

The PPS fiber obtained in the step (a) preferably has a crystallinity of 5% or more and less than 25%. In the case of a crystallinity of less than 25%, more preferably 23% or less, further preferably less than 23%, further preferably 20% or less, further preferably less than 20% or less, the resulting PPS long fiber nonwoven web will have improved bonding properties for thermal bonding and high mechanical strength while maintaining a required quantity of amorphous portions. On the other hand, a required amount of crystals can be kept by adjusting the crystallinity to 5% or more, preventing shrinkage in width and wrinkles of a nonwoven web, fiber-melting in thermal bonding, perforation of the nonwoven web at the time of thermo-compression bonding with a thermal embossing roll.

As a means of subjecting the filaments solidified by cooling to heat treatment before the ejector outlet, available methods include, for example, heating the filaments until it is introduced into the ejector by an infrared heater or a hot plate, heating the main body of the ejector, and heating the compressed air to be blown off from the ejector to pull and stretch the filament. Of them, a preferable one is the method of heating the compressed air from the ejector because it can heat each filament relatively uniformly.

In the case of using heated compressed air as the means of heat treatment of the filaments, the temperature of the air is preferably 100° C. or more and less than the melting point of the PPS resin. Compressed air heated at a temperature of 100° C. or more, more preferably 120° C. or more, further preferably 160° C. or more, further preferably 200° C. or more can result in effective heating of filaments of PBS fibers, effectively imparting thermal stability to the PPS fibers. Thus, the nonwoven web can be prevented from suffering from shrinkage in width and wrinkles due to thermal shrinkage when being subjected to thermal bonding. In addition, by adjusting the temperature of the compressed air to less than the melting point of the PPS resin, the filaments to be pulled and stretched can be prevented from melting. The melting point of the PPS resin is generally 278 to 285° C.

The temperature of the compressed air defined herein is neither the preset temperature of a device for heating the compressed air nor the surface temperature of piping or the like for supplying the compressed air, but the actual temperature of the compressed air just before being introduced into the ejector. In FIG. 1, as an example, an ejector 1 is connected to a compressed air supplying pipe 2 that can supply compressed air to the ejector. Compressed air 5 supplied from the compressed air supplying pipe 2 is blown to filaments 7 in spinning movement, while the filaments 7 is pulled and stretched. A temperature sensor 4 of a thermometer 6 is placed at a position 3 for measuring the temperature just before introduction of the compressed air into the ejector 1 through the compressed air supplying pipe 2. Thus, the temperature of the compressed air 5 is measured during the spinning movement of the filaments 7 in the ejector 1.

As a means of heating the compressed air, heating it up to a desired temperature using an air heater is preferable.

As the shape of the spinneret or the ejector, various shapes such as a round shape and a rectangular shape can be employed. However, a combination of a rectangular nozzle and a rectangular ejector is preferred from the viewpoint that the amount of the compressed air used is comparatively small and fusion bonding or abrasion between filaments will not occur significantly.

For the dimensions of the ejector for the use of heated compressed air, the distance 9 from the air gap 8, the jet orifice for compressed air 5, to the outlet of the ejector's main body 1 (hereinafter, referred to as the length of the ejector) is preferably 10 cm or more. A length of the ejector of 10 cm or more, more preferably 20 cm or more allows PPS fibers to be effectively subjected to heat treatment. The upper limit of the length of the ejector is preferably 200 cm or less from the view point of the fiber-opening property of filaments.

It is important that the spinning speed in the step (a) is 3,000 m/min or more. The spinning speed is 3,000 m/min or more, more preferably 3,500 m/min, more preferably 4,000 m/min or more. An improvement in thermal dimension stability can be attained by the above heat treatment. On the other hand, although the upper limit is not specifically limited, the spinning speed is preferably less than 6,000 m/min. A spinning speed of less than 6,000 m/min allows the filaments discharged from the spinneret to be deformed smoothly at the time of the stretching to prevent fiber breakage. Thus, filaments can be stably produced. In addition, energy consumption of air supplied to the ejector can be saved.

The average single fiber fineness of the PPS fiber is preferably 0.5 to 10 dtex. By adjusting the average single fiber fineness to 0.5 dtex or more, more preferably 1 dtex or more, more preferably 2 dtex or more, the spinnability of the fiber can be maintained and frequent occurrence of fiber breakage can be prevented. In addition, by adjusting the average single fiber fineness to 10 dtex or less, more preferably 5 dtex or less, more preferably 4 dtex or less, the discharge rate of melted resin per hole of the spinneret can be kept low to enable sufficient cooling of the fiber, and a decrease in spinnability due to fusion bonding between fibers can be prevented. Furthermore, from the view point of suppressing irregularity in weight per unit area of the non-woven fabric to make the surface quality better, or from the viewpoint of dust-collecting performance in the case of subjecting the non-woven fabric to filtration, the average single fiber fineness of the filaments is more preferably 10 dtex or less, more preferably 5 dtex or less, further preferably 4 dtex or less.

As step (b) subsequent to the step (a), a step of collecting the long fiber on a moving net to form a nonwoven fabric web is performed.

Our method achieves effective thermal bonding and, accordingly, it can be suitable for the production of a long fiber nonwoven fabric with a high weight per unit area. The weight per unit area of the long fiber nonwoven fabric obtained is preferably 100 to 400 g/m$^2$, more preferably 150 to 300 g/m$^2$.

Between the step (b) and the step (c) described later, a step for subjecting a nonwoven fabric to temporary bonding at a temperature less than the crystallization temperature of the long fiber is preferably performed as step (d) using calender rolls. By doing so, the thickness of the nonwoven fabric obtained can be controlled to improve transportability and equalize variations in thickness thereof in the width direction. The temporary bonding by calender rolls may be performed using a pair of upper and lower calender rolls with flat surfaces. The calender rolls may be a combination of upper and lower metal rolls or a combination of a metal roll or a resin or paper roll.

The temperature of the calender rolls in the step (d) is preferably less than the crystallization temperature of the long fiber. By doing so, an excessive crystallization of the PPS fiber can be prevented from being accelerated and the thermal bonding in the step (c) described later can be effectively performed. On the other hand, the temperature of temporary bonding is preferably 80° C. or more to achieve the effects of the temporary bonding as described above.

The linear pressure of the calender rolls in the step (d) is preferably 5 to 70 kgf/cm (49 to 686 N/cm). By setting the linear pressure to 5 kgf/cm (49 N/cm) or more, more preferably 15 kgf/cm (147 N/cm) or more, the effects of the temporary bonding as described above can be efficiently obtained. On the other hand, by setting the linear pressure to 70 kgf/cm (686 N/cm) or less, more preferably 40 kgf/cm (392 N/cm) or less, a nonwoven fabric can be prevented from becoming too thin like a paper sheet and the characteristic features thereof such as air permeability can be prevented from being impaired.

After completing the step (b) or preferably the step (d), the nonwoven web obtained is subjected to thermal bonding as step (c).

The method for thermal bonding in the step (c) may employ thermo-compression bonding using any of various rolls such as thermal embossing rolls composed of a pair of upper and lower rolls with engraved surfaces, thermal embossing rolls composed of a combination of a roll with a flat surface and a roll with an engraved surface, and thermal calender rolls composed of a combination of upper and lower rolls with flat (smooth) surfaces, or may employ an air-through method for passing hot air through the nonwoven web in its thickness direction. Among them, thermal bonding by using embossing rolls, which is able to retain moderate air permeability while improving the mechanical strength, can be preferably employed.

The engraving pattern of the thermal embossing rolls may be in the form of a circle, an ellipse, a square, a rectangle, a parallelogram, a lozenge, a right hexagon, a right octagon, or the like.

The surface temperature of the thermal embossing rolls is preferably 250 to 280° C. By setting the thermal bonding temperature to 250° C. or more, more preferably 255° C. or more, thermal bonding can be sufficiently performed to prevent a sheet from peeling or "fuzzing." On the other hand, by setting the thermal bonding temperature at 280° C. or less, more preferably 275° C. or less, fibers are prevented from being melted to cause the perforation of a press-bonded part.

The linear pressure of the thermal embossing rolls during thermal bonding is preferably 20 to 150 kgf/cm (196 to 1470 N/cm). By setting the linear pressure of the rolls to 20 kg/cm (196 N/cm) or more, more preferably 30 kgf/cm (294 N/cm) or more, thermal bonding can be sufficiently performed to prevent a sheet from peeling or fuzzing. On the other hand, by setting the linear pressure of the rolls at 150 kg/fcm (1470 N/cm) or less, more preferably 100 kgf/cm (980 N/cm) or less, the protruded portions of the engraving rolls are prevented from biting deeply into the sheet to cause difficulty in peeling and breakage of the sheet.

The bonding area with the thermal embossing rolls is preferably 8 to 40%. By setting the bonding area to 8% or more, preferably 10% or more, more preferably 12% or more, the long fiber nonwoven fabric can be provided with a strength enough for practical uses. On the other hand, by setting the bonding area to 40% or less, more preferably 30% or less, further preferably 20% or less, the nonwoven fabric can be prevented from becoming a film-like product. Thus, the characteristics of the nonwoven fabric such as air permeability can be prevented from becoming difficult to develop. The term "bonding area" used herein for thermal bonding by rolls having a pair of protruding and depressed portions refers to the proportion of the area where the protruding portions of the upper roll and the protruding portions of the lower roll overlap each other and abut on the nonwoven web to the entire area of the nonwoven fabric. Or, in the case of thermal bonding between a roll with protruding and depressed portions and a flat roll, it refers to the proportion of the area where the protruding portions of the roll having protruding and depressed portions abut on the nonwoven fabric to the entire area of the nonwoven fabric.

In the step (c), the nonwoven web is preferably subjected to thermal bonding without stretching and also without heat treatment under strain at a temperature of not lower than the crystallization of the PPS long fiber. For the conventional methods for producing a PPS long-fiber nonwoven fabric, stretching for improving dimensional stability against heat and heat treatment under stress at a temperature not lower than the crystallization of a PPS long fiber have been proposed (see, for example, JP '919 and JP '209 mentioned above). In contrast, even if these treatments are not carried out, our method is able to improve thermal dimensional stability. Elimination of these treatments is significant for simplifying facilities and saving energy.

Long fiber nonwoven fabrics obtained by our method are excellent in dimensional stability, heat resistance, flame resistance, and chemical resistance so that they can be suitably used for various industrial filters, electrical insulating materials, cell separators, membrane base materials for water treatment, heat insulation base materials, and protective clothing.

EXAMPLES

Hereinafter, the method for producing a long fiber nonwoven fabric will be specifically described with reference to examples. However, our method is not limited to these examples.

Measuring Method (1) Melt flow rate (MFR) (g/10 min)

The MFR of PPS was measured according to ASTM D1238-70 under the conditions of a measurement temperature of 315.5° C. and a measurement load of 5 kg.

(2) Average single fiber fineness (dtex)

Ten small sample pieces were taken randomly from a nonwoven web collected on the net in the step (b). Then, surface photographs were taken with a microscope at magnifications of 500 to 1,000, and 10 fibers per each sample, 100 fibers in total, were subjected to fiber width measurement, followed by calculation of their average. The average width of the single fibers was regarded as the average diameter of fibers having a round cross-section. Then, based on the solid density of the resin used, the weight per 10,000 m was calculated and rounded off to one decimal place to provide the average single fiber fineness.

(3) Spinning Speed (m/min)

From the average single fiber fineness (dtex) of fiber and the discharge rate D of the resin from a hole of the spinneret (hereinafter, simply referred to as a "single-hole discharge rate") (g/min) set up under varying conditions, the spinning speed V was calculated based on the following equation:

$$V = (10,000 \times D)/F.$$

(4) Crystallization Temperature (° C.)

Three samples were taken from a long fiber obtained after passing through an ejector and then subjected to measurement by differential scanning calorimetry (Q100, manufactured by TA Instruments Inc.) under the following conditions. The average of the measured exothermic peak temperatures was taken as the crystallization temperature. When there were a plurality of exothermic peaks, the peak at the highest temperature was employed.

Measurement atmosphere: Nitrogen flow (150 ml/min)
Temperature range: 30 to 350° C.
Heating rate: 20° C./min
Amount of sample: 5 mg (5) Melting point (° C.)

Three samples were taken from a long fiber obtained after passing through an ejector and then subjected to measurement by differential scanning calorimetry (Q100, manufactured by TA Instruments Inc.) under the following conditions. The average of the measured endothermic peak temperatures was taken as the crystallization temperature. When there were a plurality of endothermic peaks, the peak at the highest temperature was employed.

Measurement Atmosphere: Nitrogen flow (150 ml/min.)
Temperature Range: 30 to 350° C.
Heating Rate: 20° C./min.
Amount of Sample: 5 mg (6) Crystallinity (%)

Three samples were taken from a long fiber obtained after passing through an ejector and then subjected to a measurement of using a differential scanning calorimetry (Q100, manufactured by TA Instruments Inc.) under the following conditions. The average of the crystallinity calculations made by the equation described below was taken. The exotherm from cold crystallization as described below is defined as the exothermic peak area originating from cold crystallization, and the endotherm from fusion is defined as the endothermic peak area originating from fusion. The baseline used for the calculation of quantity of heat (peak area) is defined as the straight line connecting between the thermal flow in the liquid state after glass transition of amorphous material and the thermal flow in the liquid state after melting of crystals. The intersection between the baseline and the DSC curve is taken as boundary between the exothermic region and the endothermic region.

Measurement Atmosphere: Nitrogen flow (150 ml/min)
Temperature Range: 30 to 350° C.
Heating Rate: 20° C./min
Weight of sample: 5 mg $X=[(\Delta H_{endo}-\Delta H_{exo})/\Delta H_0]\times 100$ where X: Crystallinity (%)
$\Delta H_{endo}$: Endotherm from fusion (J/g)
$\Delta H_{exo}$: Exotherm from cold crystallization (J/g)
$\Delta H_0$: Heat of fusion [146.2 (J/g)].

(7) Boil-off shrinkage (%)

Long fibers having passed through the ejector were taken and five of them were aligned to prepare a sample (about 10 cm in length). A load as described below was applied to this sample and its length $L_0$ was measured. Then, the sample was immersed in boiling water for 20 minutes under no tension, taken out from the boiling water, and dried naturally. Subsequently, the length $L_1$ of the sample was measured again with the same load applied and, from the length $L_1$, the boil-off shrinkage was calculated, followed by determining the average for four samples. The calculation equations used for the load and the boil-off shrinkage are shown below. The load was rounded off to two decimals.

Load (g)=0.9×(single-hole discharge rate) (g/min)
$S=\{(L_0-L_1)/L_0\}\times 100$ where S: boil-off shrinkage (%)
$L_0$: Length before immersion (mm)
$L_1$: Length after natural drying (mm).

(8) Weight per unit area (g/m²) of nonwoven fabric

According to JIS L 1906 (2000), "5.2 Mass per unit area," three test pieces of 20 cm × 25 cm were taken from a 1 m wide area of a sample. The mass (g) of each test piece in a standard state was measured, and the average was then calculated to show the mass per m² (g/m²).

(9) Tensile strength of nonwoven fabric (N/5 cm)

The tensile strength was measured according to JIS L 1906 (2000), "5.3 Tensile strength," and the tensile strength in the longitudinal direction was measured.

(10) Thermal shrinkage of nonwoven fabric (%)

The thermal shrinkage was measured according to JIS L 1906 (2000), "5.9 Thermal shrinkage." A constant-temperature dryer was set to a temperature of 200° C., and heat treatment was performed for 10 minutes.

Example 1

PPS Resin

One hundred mole percent linear polyphenylene sulfide resin (manufactured by Toray Industries, Inc., product number: E2280, MFR: 160 g/10 min), which was not copolymerized by design with trichlorobenzene, was dried at a temperature of 160° C. for 10 hours in a nitrogen atmosphere.

Spinning and Nonwoven-web Formation

The PPS resin was melted in an extruder, and the melted resin was spun at a spinning temperature of 325° C. from a rectangular spinneret having a pore size (ϕ) of 0.50 mm at a single discharge rate of 1.38 g/min. The filaments being spun out were cooled and solidified in an atmosphere at the room temperature of 20° C. under conditions where the rectangular ejector is located at a distance of 55 cm from the rectangular spinneret. The filaments cooled and solidified were passed through the rectangular ejector of 30 cm in length. Subsequently, compressed air, which was heated at a temperature of 200° C. by an air heater and pressurized at an ejector pressure of 0.15 MPa, was blown out of the ejector, and the filaments were pulled, stretched, and then collected on a moving net to form a nonwoven web. The resulting long fiber had an average single fiber fineness of 2.8 dtex, a crystallization temperature of 111.7° C., a crystallinity of 9.4%, and a boil-off shrinkage of 6.8%. In addition, the spinning speed was 4,991 m/min, and the spinnability was high with no fiber breakage caused during 1-hour spinning Temporary Bonding and Thermal Bonding Following this, the non-woven web obtained was temporarily bonded at a temporary bonding temperature of 100° C. under a linear pressure of 20 kgf/cm (196 N/cm) by a pair of upper and lower metallic calender rolls installed in an in-line configuration. Subsequently, it was thermally bonded at a thermal bonding temperature of 270° C. under a linear pressure of 100 kgf/cm (980 N/cm) by a pair of embossing rolls with a bonding area ratio of 12%, composed of a metallic upper roll with an engraved polka-dot pattern and a flat lower roll made of metal. Thus, a long fiber nonwoven fabric was obtained. These steps of temporary bonding and thermal bonding did not contain pulling or heat treatment under strain at or above the crystallization temperature of the long fiber. The fabric obtained was of good quality without suffering from significant shrinkage in width o wrinkles due to thermal shrinkage during the thermal bonding between embossing rolls. The long fiber nonwoven fabric obtained had a weight per unit area of 248g/m², a longitudinal tensile strength of 408 N/5 cm, a longitudinal thermal shrinkage of 0.0%, and a lateral thermal shrinkage of −0.2%.

Example 2

PPS Resin

The same PPS resin as used in Example 1 was used.

Spinning and Nonwoven-web Formation

Spinning and nonwoven-web formation were performed using the above PPS resin in the same manner as in Example 1, except that the temperature of the compressed air was 230° C. and the ejector pressure was 0.13 MPa. The resulting long fiber had an average single fiber fineness of 3.2 dtex, a crystallization temperature of 112.4° C., a crystallinity of 14.8%, and a boil-off shrinkage of 3.0%. In addition, the spinning speed was 4,294 m/min, and the spinnability was high with no fiber breakage caused during 1-hour spinning Temporary Bonding and Thermal Bonding Subsequently, temporary bonding and thermal bonding were performed on the nonwoven web in the same manner as in Example 1, thereby obtaining a long fiber nonwoven fabric. The fabric obtained was of good quality without suffering from significant shrinkage in width or wrinkles due to thermal shrinkage during the thermal bonding between embossing rolls. The long fiber nonwoven fabric obtained had a weight per unit area of 251 g/m², a longitudinal tensile strength of 399 N/5 cm, a longitudinal thermal shrinkage of −0.1%, and a lateral thermal shrinkage of −0.2%.

Example 3

PPS Resin

The same PPS resin as used in Example 1 was used.

Spinning and Nonwoven-web Formation

Spinning and nonwoven-web formation were performed using the above PPS resin in the same manner as in Example 1, except that the temperature of the compressed air was 129° C. and the ejector pressure was 0.20 MPa. The resulting long fiber had an average single fiber fineness of 2.4 dtex, a crystallization temperature of 111.4° C., a crystallinity of 18.5%, and a boil-off shrinkage of 7.5%. In addition, the spinning speed was 5,727 m/min, and spinnability was good as no fiber breakage caused in 1-hour spinning Temporary Bonding and Thermal Bonding Subsequently, temporary bonding and thermal bonding were performed on the nonwoven web in the same manner as in Example 1, thereby obtaining a long fiber nonwoven fabric. The fabric obtained was of good quality without suffering from significant shrinkage in width or wrinkles due to thermal shrinkage during the thermal bonding between embossing rolls. The long fiber nonwoven fabric obtained had a weight per unit area of 245 g/m², a longitudinal tensile strength of 382 N/5cm, a longitudinal thermal shrinkage of −0.1%, and a lateral thermal shrinkage of 0.0%.

Example 4

PPS Resin

The same PPS resin as used in Example 1 was used.

Spinning and Nonwoven-web Formation

Spinning and nonwoven-web formation were performed using the above PPS resin in the same manner as in Example 1, except that the temperature of the compressed air was 115° C. and the ejector pressure was 0.21 MPa. The resulting long fiber had an average single fiber fineness of 2.4 dtex, a crystallization temperature of 111.5° C., a crystallinity of 18.7%, and a boil-off shrinkage of 8.3%. In addition, the spinning speed was 5,843 m/min, and spinnability was high with no fiber breakage caused during 1-hour spinning Temporary Bonding and Thermal Bonding Subsequently, temporary bonding and thermal bonding were performed on the nonwoven web in the same manner as in Example 1, thereby obtaining a long fiber nonwoven fabric. The fabric obtained was of good quality without suffering from significant shrinkage in width or wrinkles due to thermal shrinkage during the thermo-compression bonding between embossing rolls. The long fiber nonwoven fabric obtained had a weight per unit area of 248 g/m², a longitudinal tensile strength of 385 N/5cm, a longitudinal thermal shrinkage of −0.1%, and a lateral thermal shrinkage of 0.0%.

Comparative Example 1

PPS Resin

The same PPS resin as used in Example 1 was used.

Spinning and Nonwoven-web Formation

Spinning and nonwoven-web formation were performed using the above PPS resin in the same manner as in Example 1, except that the temperature of the compressed air was normal temperature (29° C.) and the ejector pressure was 0.20 MPa. The resulting long fiber had an average single fiber fineness of 2.6 dtex, a crystallization temperature of 113.1° C., a crystallinity of 8.9%, and a boil-off shrinkage of 34.3%. In addition, the spinning speed was 5,184 m/min, and spinnability was high with no fiber breakage caused during 1-hour spinning Temporary Bonding and Thermal Bonding Subsequently, temporary bonding and thermal bonding were attempted on a nonwoven web in the same manner as in Example 1. However, the nonwoven web underwent significant shrinkage in width and solidification due to thermal shrinkage during the thermal bonding between embossing rolls. Thus, it was impossible to emboss the nonwoven web successfully.

Comparative Example 2

PPS Resin

The same PPS resin as used in Example 1 was used.

Spinning and Nonwoven-web Formation

Spinning and nonwoven-web formation were performed using the above PPS resin in the same manner as in Example 1, except that the ejector pressure was 0.05 MPa. The resulting long fiber had an average single fiber fineness of 5.4 dtex, a crystallization temperature of 123.1° C., a crystallinity of 6.2%, and a boil-off shrinkage of 45.7%. In addition, the spinning speed was 2,564 m/min, and spinnability was high with no fiber breakage caused during 1-hour spinning Temporary Bonding and Thermal Bonding Subsequently, temporary bonding and thermal bonding were attempted on a nonwoven web in the same manner as in Example 1. However, the nonwoven web underwent significant shrinkage in width and solidification due to thermal shrinkage during the thermal bonding between embossing rolls. Thus, it was impossible to emboss the nonwoven web successfully.

Comparative Example 3

PPS Resin

The same PPS resin as used in Example 1 was used.

Spinning and Nonwoven-web Formation

Spinning and nonwoven-web formation were performed using the above PPS resin in the same manner as in Example 1, except that the temperature of the compressed air was normal temperature (29° C.) and the ejector pressure was 0.30 MPa. Frequent fiber breakage occurred immediately after the start of spinning, and fiber breakage occurred 100 times or more during 1-hour spinning, making it difficult to produce a nonwoven web. The resulting long fiber had an average single fiber fineness of 2.1 dtex, which was converted into a spinning speed of 6,723 m/min.

TABLE 1

| | | Unit | Example 1 | Example 2 | Example 3 | Example 4 | Comparative Example 1 | Comparative Example 2 | Comparative Example 3 |
|---|---|---|---|---|---|---|---|---|---|
| PPS resin | MFR | g/min | 160 | 160 | 160 | 160 | 160 | 160 | 160 |
| Spinning | Spinning temperature | °C. | 325 | 325 | 325 | 325 | 325 | 325 | 325 |
| | Spinneret size | mm | 0.50 dia. | 0.50 dia. | 0.50 dia. | 0.50 dia. | 0.50 dia. | 0.50 dia. | 0.50 dia. |
| | Spinneret single-hole discharge rate | g/min | 1.38 | 1.38 | 1.38 | 1.38 | 1.38 | 1.38 | 1.38 |
| | Compressed air temperature | °C. | 200 | 230 | 129 | 115 | Normal temperature (29) | 200 | Normal temperature (29) |
| | Ejector pressure | Mpa | 0.15 | 0.13 | 0.20 | 0.21 | 0.20 | 0.20 | 0.30 |
| | Average single fiber fineness | dtex | 2.8 | 3.2 | 2.4 | 2.4 | 2.6 | 5.4 | 2.1 |
| | Spinning speed | m/min | 4991 | 4294 | 5727 | 5843 | 5184 | 2564 | 6723 |
| | Crystallization temperature | °C. | 111.7 | 112.4 | 111.4 | 111.5 | 113.1 | 123.1 | — |
| | Crystallinity | % | 9.4 | 14.8 | 18.5 | 18.7 | 8.9 | 6.2 | — |
| | Boil-off shrinkage | % | 6.8 | 3.0 | 7.5 | 8.3 | 34.3 | 45.7 | — |
| Temporary bonding | Temperature | °C. | 100 | 100 | 100 | 100 | 100 | 100 | — |
| | Linear pressure | kgf/cm | 20 | 20 | 20 | 20 | 20 | 20 | — |
| Thermal bonding | Temperature | °C. | 270 | 270 | 270 | 270 | 270 | 270 | — |
| | Linear pressure | kgf/cm | 100 | 100 | 100 | 100 | 100 | 100 | — |
| Nonwoven fabric | Weight per unit area | g/m² | 248 | 251 | 245 | 248 | — | — | — |
| | Tensile strength (longitudinal) | N/5 cm | 408 | 399 | 382 | 385 | — | — | — |
| | Thermal shrinkage Longitudinal | % | 0.0 | -0.1 | -0.1 | -0.1 | — | — | — |
| | Thermal shrinkage Lateral | % | -0.2 | -0.2 | 0.0 | 0.0 | — | — | — |
| Remarks | | | | | | | Processing is impossible due to significant width shrinkage during thermal compression bonding | Processing is impossible due to significant width shrinkage during thermal compression bonding | Nonfabric web formation is impossible due to frequent fiber breakage |

As described in Examples 1 to 4, filaments pulled and stretched after being discharged by heated compressed air at a spinning speed of 4,294 to 5,853 m/min were successfully processed by thermal bonding between embossing rolls to provide a wrinkle-free long fiber nonwoven fabric without carrying out heat treatment of the nonwoven web at or above the crystallization temperature which had been conventionally necessary for increased dimensional stability. In addition, the resulting long fiber nonwoven fabric showed almost no thermal shrinkage at a temperature of 200° C., and had excellent thermal dimensional stability.

On the other hand, in Comparative Example 1 in which compressed air at normal temperature (29° C.) was used and Comparative Example 2 in which pulling and stretching were performed at a spinning speed of 2,564 m/min, significant boil-off shrinkage occurred to cause a large shrinkage in width of the nonwoven web during thermal bonding. Thus, the nonwoven web was not embossed successfully due to shrinkage and solidification. In Comparative Example 3 in which the spinning speed was increased by increasing the flow of compressed air at normal temperature (29° C.), frequent fiber breakage occurred immediately after the start of spinning, making it impossible to perform nonwoven-web formation.

Industrial Applicability

It becomes possible to produce a long fiber nonwoven fabric that comprises resin containing PPS as main component and that does not suffer from shrinkage in width and wrinkles due to thermal shrinkage during thermal bonding of a nonwoven web.

The invention claimed is:

1. A method of producing a long fiber nonwoven fabric comprising steps (a) to (c) in sequence:
   (a) melting resin containing polyphenylene sulfide as main component, discharging it from a spinneret, solidifying resulting filaments by cooling, and stretching the filaments by pulling them out of an ejector at a spinning speed of 3,000 m/min or more while heat-treating as the filaments travel to the ejector outlet to provide a long fiber;
   (b) collecting the long fiber on a moving net to form a nonwoven web; and
   (c) subjecting the nonwoven web to thermal bonding;
   wherein the heat treating in step (a) is performed by supplying heated compressed air from an ejector, and the heated compressed air from the ejector in step (a) has a temperature of 100° C. or more and lower than the melting point of the resin containing polyphenylene sulfide as a main component.

2. The method according to claim 1, wherein in the step (c), the nonwoven web is subjected to thermal bonding without stretching and also without heat-treating under strain at a temperature of not lower than the crystallization temperature of the PPS long fiber.

3. The method according to claim 1, wherein the long fiber obtained in the step (a) has a crystallinity of 5% or more and less than 25%.

4. The method according to claim 1, wherein between the step (b) and the step (c), a step (d) for subjecting the nonwoven fabric to temporary bonding at a temperature lower than the crystallization temperature of the long fiber is performed using calender rolls.

5. The method according to claim 2, wherein the heat treatment in the step (a) is performed by supplying heated compressed air from an ejector.

6. The method according to claim 2, wherein the long fiber obtained in the step (a) has a crystallinity of 5% or more and less than 25%.

7. The method according to claim 4, wherein the long fiber obtained in the step (a) has a crystallinity of 5% or more and less than 25%.

8. The method according to claim 5, wherein the long fiber obtained in the step (a) has a crystallinity of 5% or more and less than 25%.

9. The method according to claim 2, wherein between the step (b) and the step (c), a step (d) for subjecting the nonwoven fabric to temporary bonding at a temperature lower than the crystallization temperature of the long fiber is performed using calender rolls.

10. The method according to claim 5, wherein between the step (b) and the step (c), a step (d) for subjecting the nonwoven fabric to temporary bonding at a temperature lower than the crystallization temperature of the long fiber is performed using calender rolls.

11. A method of producing a long fiber nonwoven fabric comprising steps (a) to (c) in sequence:
   (a) melting resin containing polyphenylene sulfide as main component, discharging it from a spinneret, solidifying resulting filaments by cooling, and stretching the filaments by pulling them out of an ejector at a spinning speed of 3,000 m/min or more while heat-treating at a temperature of more than 100° C. as the filaments travel to the ejector outlet to provide a long fiber;
   (b) collecting the long fiber on a moving net to form a nonwoven web; and
   (c) subjecting the nonwoven web to thermal bonding.

12. A method of producing a long fiber nonwoven fabric comprising steps (a) to (c) in sequence:
   (a) melting resin containing potyphenylene sulfide as main component, discharging it from a spinneret, solidifying resulting filaments by cooling, and stretching the filaments by pulling them out of an ejector at a spinning speed of 3,000 m/min or more while heat-treating at a temperature of 200° C. or more as the filaments travel to the ejector outlet to provide a long fiber;
   (b) collecting the long fiber on a moving net to form a nonwoven web; and
   (c) subjecting the nonwoven web to thermal bonding.

\* \* \* \* \*